(12) United States Patent
Lin et al.

(10) Patent No.: US 11,960,040 B2
(45) Date of Patent: Apr. 16, 2024

(54) MANUFACTURING METHOD OF X-RAY DEVICE

(71) Applicant: InnoCare Optoelectronics Corporation, Tainan (TW)

(72) Inventors: Wen Chien Lin, Tainan (TW); Chih-Hao Wu, Tainan (TW)

(73) Assignee: InnoCare Optoelectronics Corporation, Tainan (TW)

( * ) Notice: Subject to any disclaimer, the term of this patent is extended or adjusted under 35 U.S.C. 154(b) by 0 days.

(21) Appl. No.: 18/308,657

(22) Filed: Apr. 27, 2023

(65) Prior Publication Data

US 2023/0258829 A1    Aug. 17, 2023

Related U.S. Application Data

(63) Continuation of application No. 17/316,742, filed on May 11, 2021.

(30) Foreign Application Priority Data

May 22, 2020 (TW) .................. 109117035

(51) Int. Cl.
*G01T 1/20* (2006.01)
*G01T 1/208* (2006.01)
*G01T 1/24* (2006.01)

(52) U.S. Cl.
CPC .......... *G01T 1/20181* (2020.05); *G01T 1/208* (2013.01); *G01T 1/247* (2013.01)

(58) Field of Classification Search
None
See application file for complete search history.

(56) References Cited

U.S. PATENT DOCUMENTS 4,870,667 A    9/1989    Brunnett et al.
7,375,341 B1   5/2008    Nagarkar et al.

FOREIGN PATENT DOCUMENTS

CN    101842901    9/2010
JP    2006189377   7/2006

OTHER PUBLICATIONS

"Office Action of China Counterpart Application", issued on Nov. 30, 2023, p. 1-p. 10.

*Primary Examiner* — Edwin C Gunberg
(74) *Attorney, Agent, or Firm* — JCIPRNET

(57) ABSTRACT

An X-ray device, including a sensor panel and a flexible scintillator structure disposed on the sensor panel, is provided. A manufacturing method of the X-ray device is also provided.

10 Claims, 3 Drawing Sheets

MANUFACTURING METHOD OF X-RAY DEVICE

CROSS-REFERENCE TO RELATED APPLICATION

This application is a continuation application of and claims the priority benefit of U.S. application Ser. No. 17/316,742, filed on May 11, 2021, now allowed, which claims the priority benefit of Taiwan application serial no. 109117035, filed on May 22, 2020. The entirety of each of the above-mentioned patent applications is hereby incorporated by reference herein and made a part of this specification.

BACKGROUND

Technical Field

This disclosure relates to an X-ray device and a manufacturing method thereof.

Description of Related Art

An X-ray device may convert an X-ray into visible light through a scintillator and form an image through a sensor panel sensing the visible light. The scintillator may be directly formed on the sensor panel or formed on the sensor panel through a bonding process. In the latter manufacturing method, the scintillator is usually formed on a hard carrier board first, before attaching the hard carrier board formed with the scintillator to the sensor panel. Since such bonding process belongs to hard-to-hard bonding, issues such as difficulty in large-area bonding and easy generation of air bubbles on the bonding surface exist, resulting in low yield and/or high cost of the X-ray device.

SUMMARY

This disclosure provides an X-ray device and a manufacturing method thereof, which helps to improve yield or reduce cost.

An embodiment of the disclosure provides an X-ray device, which includes a sensor panel and a flexible scintillator structure. The flexible scintillator structure is disposed on the sensor panel.

An embodiment of the disclosure provides a manufacturing method of an X-ray device, which includes the following steps. A carrier board is provided. A flexible scintillator structure is disposed on the carrier board. The carrier board is removed. The flexible scintillator structure is disposed on a sensor panel.

Based on the above, in the embodiments of the disclosure, since the scintillator structure is flexible, a vacuum bonding machine for hard-to-hard bonding may not be used when the flexible scintillator structure is disposed on the sensor panel, thereby overcoming issues such as difficulty in large-area bonding or easy generation of air bubbles on the bonding surface. As a result, the X-ray device and the manufacturing method thereof according to the embodiments of the disclosure help to improve yield or reduce cost.

To make the abovementioned features and advantages of the disclosure more comprehensible, exemplary embodiments in concert with drawings are described in detail below.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and together with the description, serve to explain the principles of the disclosure.

DESCRIPTION OF THE EMBODIMENTS

Figure 1:
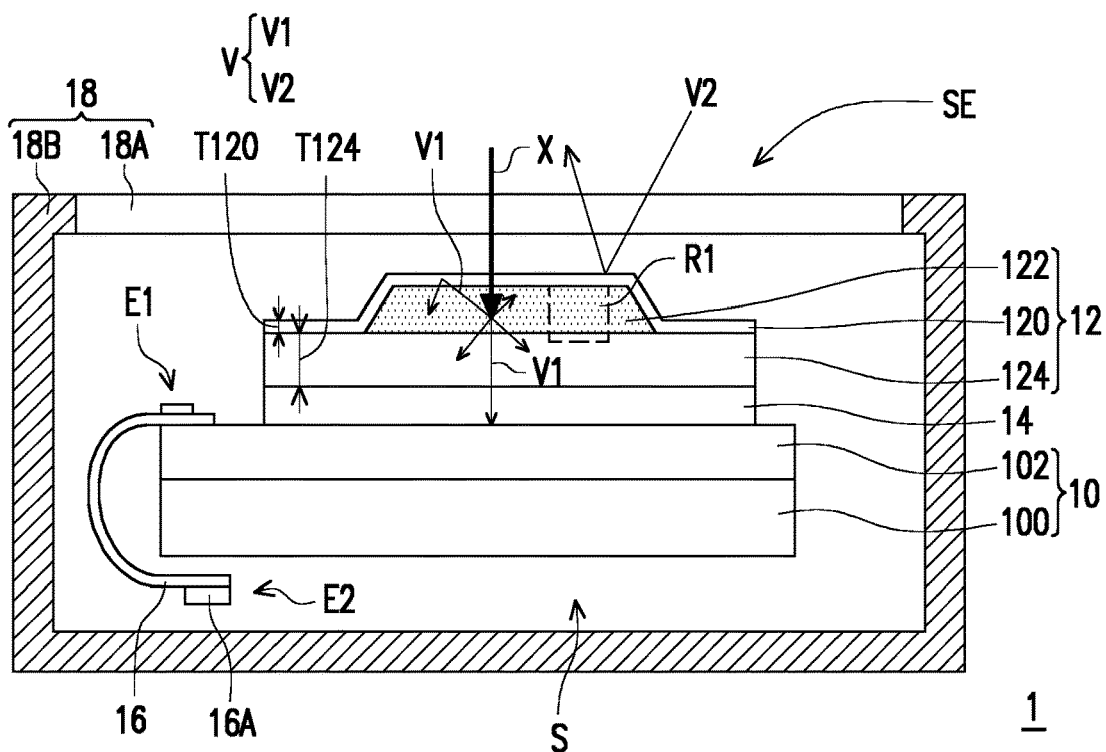
FIG. 1 is a schematic cross-sectional view of an X-ray device according to an embodiment of the disclosure.

The disclosure may be comprehended with reference to the following detailed description in conjunction with the accompanying drawings. It should be noted that, to make it more comprehensible for readers and to simplify the drawings, the drawings in the disclosure depict a part of an electronic device, and specific elements in the drawings are not drawn to scale. In addition, the number and size of various elements in the drawings are merely exemplary, and are not intended to limit the scope of the disclosure. For example, the relative sizes, thicknesses, and positions of various film layers, regions, and/or structures may be reduced or enlarged for clarity.

Certain words are used to refer to specific elements in the entire specification and the appended claims of the disclosure. Persons skilled in the art should understand that electronic equipment manufacturers may use different names to refer to the same element. The text is not intended to distinguish elements that have the same function but different names. In the following specification and the appended claims, words such as "having" and "including" are open-ended words, therefore they should be interpreted as "including but not limited to . . . ".

Directional terms, such as "upper", "lower", "front", "back", "left", and "right", mentioned in the text refer to directions in the accompanying drawings. Therefore, the directional terms are used for illustration, and are not intended to limit the disclosure. It should be understood that when an element or a film layer is referred to as being "on" or "connected to" another element or film, the element or the film layer may be directly on or connected to the other element or film layer, or there may be an element or a film layer inserted between the two (in the case of being indirectly connected). Conversely, when an element or a film layer is referred to as being "directly on" or "directly connected to" another element or film layer, there is no element or film layer inserted between the two.

The terms "approximately", "equal to", "same as", "similar to", "substantially", or "generally" mentioned in the text usually represent falling within a 10% range of a given numerical value or range, or represent falling within a of 5%, 3%, 2%, 1%, or 0.5% range of the given numerical value or range. In addition, phrases such as "a given range is a first numerical value to a second numerical value" and "a given range falls within a range of a first numerical value to a second numerical value" represent that the given range includes the first numerical value, the second numerical value, and other numerical values therebetween.

In some embodiments of the disclosure, terms related to bonding and connection, such as "connect" and "interconnect", unless specifically defined, may mean that two structures are in direct contact, or may mean that two structures are not in direct contact, wherein there is another structure disposed between the two structures. The terms related to bonding and connection also include the cases where both structures are movable or both structures are fixed. In addition, the terms "electrically connected" and "coupled" include any direct and indirect means of electrical connection.

In the following embodiments, the same or similar element will adopt the same or similar reference numerals, and the repetition thereof will be omitted. In addition, the features in the embodiments may be used in any combination as long as they do not depart from the spirit of the disclosure or conflict with each other, and simple equivalent changes and modifications according to the specification or the appended claims shall still fall within the scope of the disclosure. Furthermore, the terms such as "first" and "second" mentioned in this specification or the appended claims are used to name different elements or to distinguish between different embodiments or ranges, and are not intended to limit the upper or lower limit of the number of elements and the manufacturing order or configuring order of the elements.

FIG. 1 is a schematic cross-sectional view of an X-ray device according to an embodiment of the disclosure. With reference to FIG. 1, an X-ray device 1 may include a sensor panel 10 and a flexible scintillator structure 12. The flexible scintillator structure 12 is disposed on the sensor panel 10. The flexible scintillator structure 12 is adapted to convert an X-ray X incident onto the X-ray device 1 into a visible light V. The sensor panel 10 is adapted to sense the visible light V and generate an image corresponding to the light intensity distribution of the visible light V.

In some embodiments, the sensor panel 10 may include a substrate 100 and a sensor array 102, wherein the sensor array 102 is located between the flexible scintillator structure 12 and the substrate 100. The substrate 100 is adapted to carry the sensor array 102. The substrate 100 may be a rigid substrate, a soft substrate, a curved substrate, a flexible substrate, or any type of substrate according to different requirements. In addition, the light transmittance of the substrate 100 is not limited, that is, the substrate 100 may be a transparent substrate, a translucent substrate, or an opaque substrate. For example, the material of the substrate 100 may, for example, include glass, plastic, ceramic, stainless steel, quartz, sapphire, polyimide (PI), polycarbonate (PC), polyethylene terephthalate (PET), or a combination of the foregoing, but is not limited thereto.

In an embodiment, the sensor array 102 may be adapted to sense the visible light V. For example, the sensor array 102 may include multiple sensing units (not shown) and a circuit (not shown) electrically connected to the sensing units. The sensing units are arranged in an array to generate an image. At least one sensing unit may include one or more switch elements, and one or more photosensitive elements electrically connected to the one or more switch elements. The switch element may, for example, include a thin film transistor that, for example, includes a top gate, a bottom gate, or a double gate thin film transistor made of amorphous silicon, low temperature poly-silicon (LTPS), or metal oxide, but is not limited thereto. The photosensitive element may, for example, include a photodiode. However, the arrangement of the sensing units, the number of switch elements included by each sensing unit, the number of photosensitive elements included by each sensing unit, the type of switch elements, or the type of photosensitive elements may be changed according to requirements, and is not limited thereto.

In some embodiments, the flexible scintillator structure 12 may include a first flexible layer 120 and a scintillator layer 122, wherein the scintillator layer 122 is located between the first flexible layer 120 and the sensor panel 10. In some embodiments, the flexible scintillator structure 12 may further include a second flexible layer 124, and the second flexible layer 124 is located between the scintillator layer 122 and the sensor panel 10.

The second flexible layer 124 may be configured to carry the first flexible layer 120 and the scintillator layer 122. In some embodiments, the material of the second flexible layer 124 may include polyimide (PI), glass, polyethylene terephthalate (PET), polyethylene naphthalate (PEN), or other suitable materials. In some embodiments, a thickness T124 of the second flexible layer 124 may be greater than or equal to 5 micrometers (μm) and less than or equal to 100 but is not limited thereto. In some embodiments, the transmittance of the second flexible layer 124 to light with a wavelength of 530 nanometers (nm) may be greater than 70%, but is not limited thereto.

The scintillator layer 122 is disposed on the second flexible layer 124. In some embodiments, the material of the scintillator layer 122 may include cesium iodide (CsI), but is not limited thereto. In other embodiments, the material of the scintillator layer 122 may include other types of inorganic scintillators or organic scintillators. In some embodiments, the scintillator layer 122 may be formed on the second flexible layer 124 via a deposition process. The deposition process may include an evaporation deposition process, but is not limited thereto.

Figure 2:
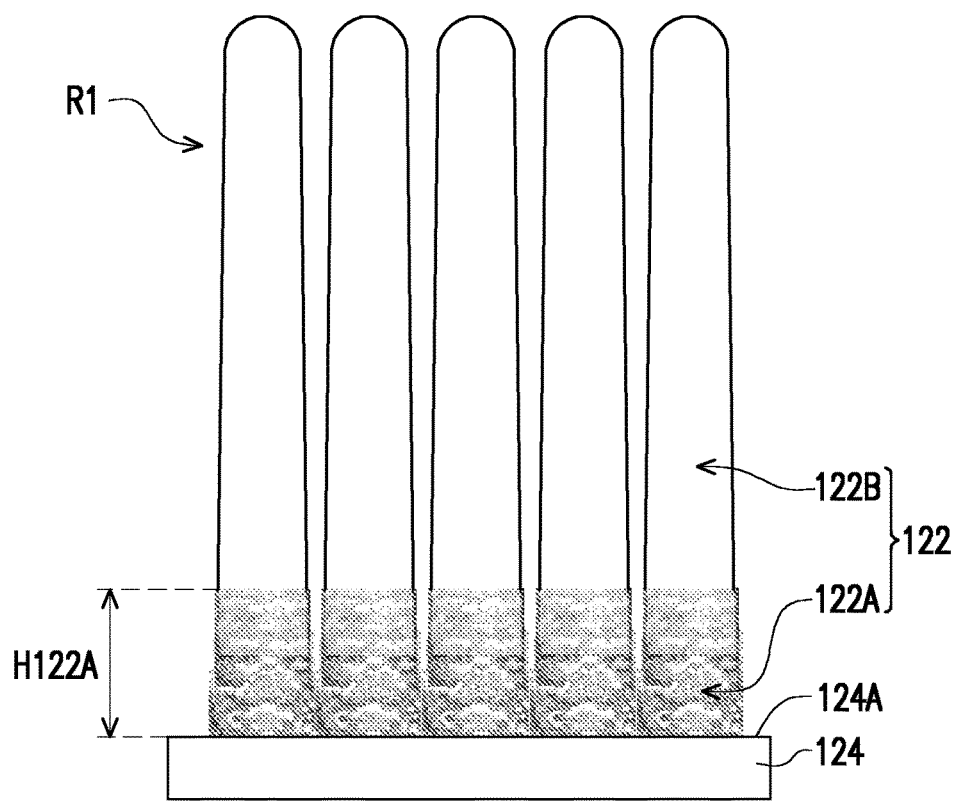
FIG. 2 is an enlarged view of a region R1 in FIG. 1.

FIG. 2 is an enlarged view of a region R1 in FIG. 1, which may, for example, be a schematic view of a partial structure of the scintillator layer 122 and the second flexible layer 124. With reference to FIG. 2, the scintillator layer 122 formed on the second flexible layer 124 via the deposition process may include a polycrystalline part 122A and a single crystal part 122B, wherein the polycrystalline part 122A is adjacent to the sensor panel 10 (refer to FIG. 1), while the single crystal part 122B is away from the sensor panel 10. In another embodiment, the single crystal part 122B is adjacent to the first flexible layer 120 (refer to FIG. 1), that is, the polycrystalline part 122A is located between the single crystal part 122B and the second flexible layer 124. The morphological difference of the polycrystalline part 122A and the single crystal part 122B may be observed via a scanning electron microscope (SEM), which will not be reiterated here. The polycrystalline part 122A and the single crystal part 122B are transitional structures, so there is no obvious boundary. In some embodiments of the disclosure, a height H122A of the polycrystalline part 122A may be greater than 0 μm, and for example, less than or equal to 40 μm. The height H122A of the polycrystalline part 122A is a distance between a top surface of the polycrystalline part 122A and an upper surface 124A of the second flexible layer 124.

With reference to FIG. 1 again, the first flexible layer 120 is disposed on the scintillator layer 122 and the second flexible layer 124. The first flexible layer 120 may be a stacked layer of multiple functional layers according to different requirements. The materials of the multiple functional layers may include at least two of the following: metal foil, plastic, metal, and other suitable materials, but are not limited thereto. The plastic may include PET, PEN, and parylene, but is not limited thereto.

In some embodiments, the first flexible layer 120 may include an adhesive layer (not shown). The first flexible layer 120 may be attached onto the scintillator layer 122 and the second flexible layer 124 via the adhesive layer. The first flexible layer 120 may further include a reflective layer (not shown). The reflective layer may allow X-ray to pass through and reflect the visible light V (such as a visible light V1 and a visible light V2). More precisely, the reflective layer may reflect the visible light V2 in the external ambient light, and may reduce the interference of the visible light V2 in the external ambient light on the sensing result. In addition, the reflective layer may also recover the visible light V1 transmitted toward the first flexible layer 120. For example, after the X-ray X passes through the scintillator layer 122, the X-ray is converted into the visible light V1, and after the visible light V1 reaches the reflective layer, the visible light V1 may be reflected by the reflective layer and transmitted toward the direction of the sensor panel 10, which may increase the recovery rate of the visible light V1. The first flexible layer 120 may further include a water barrier layer (not shown). The water barrier layer is adapted to block moisture from infiltrating the scintillator layer 122, thereby reducing the negative impact of moisture on the scintillator layer 122 or prolonging the usage lifespan of the scintillator layer 122. In some embodiments, the adhesive layer, the reflective layer, and the water barrier layer may be sequentially stacked on the scintillator layer 122. However, the type, number, and stacking order of the functional layers in the first flexible layer 120 may be changed according to requirements, and is not limited thereto. In some embodiments, a maximum thickness T120 of the first flexible layer 120 may fall within a range of 20 μm to 300 μm, that is, 20 μm≤T120≤300 μm, but is not limited thereto.

Although FIG. 1 shows that the flexible scintillator structure 12 is composed of three layers of structures such as the first flexible layer 120, the scintillator layer 122, and the second flexible layer 124, the number of structures of the flexible scintillator structure 12 may be increased or decreased according to requirements. For example, in some embodiments, the flexible scintillator structure 12 may omit the second flexible layer 124, but is not limited thereto.

In the X-ray device 1, since the scintillator structure is flexible, when the flexible scintillator structure 12 is disposed on the sensor panel 10, a vacuum bonding machine for hard-to-hard bonding may not be used. For example, a general roller bonding machine may be used in place of the vacuum bonding machine to simplify the bonding process, and overcome the issues of difficulty in large-area bonding and easy generation of air bubbles on the bonding surface. In this way, the yield is improved, or the cost may be reduced under the same output. The sensor panel 10 may also be a flexible sensor panel or a curved sensor panel according to different requirements. Correspondingly, the X-ray device 1 may be a flexible X-ray device or a curved X-ray device, but is not limited thereto.

The X-ray device 1 may further include other film layers or elements according to different requirements. For example, the X-ray device 1 may further include an adhesive layer 14. The adhesive layer 14 is located between the sensor panel 10 and the flexible scintillator structure 12 to bond the two. In some embodiments, the adhesive layer 14 may include a UV release tape, a thermal release tape, or a cold release tape. In another embodiment, the adhesive layer 14 may adopt a material that reduces or loses stickiness when irradiated by UV light, heated, or cooled, but is not limited thereto.

In some embodiments, the X-ray device 1 may further include a circuit board 16. The circuit board 16 is electrically connected to a circuit (not shown) in the sensor array 102, and a driving chip 16A electrically connected to the circuit may be disposed on the circuit board 16. In some embodiments, the circuit board 16 may be a flexible printed circuit board (FPCB), wherein a first end E1 of the circuit board 16 may be connected to the circuit in the sensor array 102, and a second end E2 of the circuit board 16 may be folded to the back of the sensor panel 10, so as to reduce the space occupied by the circuit board 16, thereby reducing the volume of X-ray device 1.

In some embodiments, the X-ray device 1 may further include a housing 18. For example, the housing 18 may include a light incident part 18A and a carrier part 18B. The light incident part 18A is disposed on a light incident side SE of the X-ray device 1, wherein the X-ray X enters the X-ray device 1 through the light incident part 18A. The material of the light incident part 18A may, for example, include carbon fiber, but is not limited thereto. The carrier part 18B is connected to the light incident part 18A, and the carrier part 18B and the light incident part 18A form a space S that accommodates at least the sensor panel 10, the flexible scintillator structure 12, the adhesive layer 14, and the circuit board 16. The material of the carrier part 18B may be any material adapted to carry the sensor panel 10, the flexible scintillator structure 12, the adhesive layer 14, and the circuit board 16, and is not limited thereto.

Figure 3:
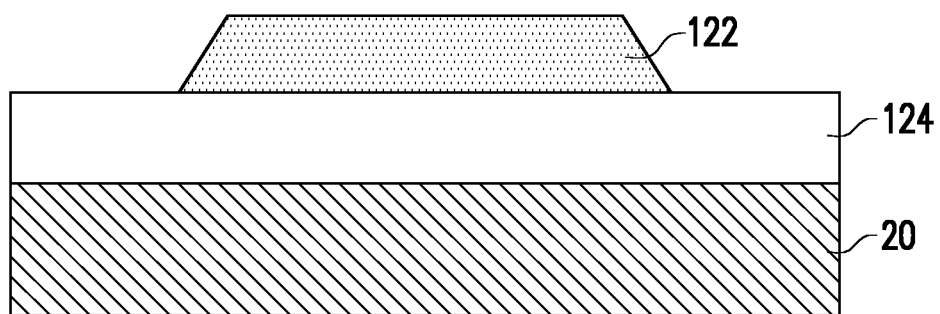
FIGS. 3 to 6 are schematic cross-sectional views of a manufacturing process of an X-ray device according to an embodiment of the disclosure.

FIGS. 3 to 6 are schematic cross-sectional views of a manufacturing process of an X-ray device according to an embodiment of the disclosure. With reference to FIG. 3, a carrier board 20 is provided. The carrier board 20 is a hard carrier board. For example, the material of the carrier board 20 may include glass, ceramic, or stainless steel, but is not limited thereto.

The second flexible layer 124 is disposed on the carrier board 20. For example, the second flexible layer 124 may be attached onto the carrier board 20 via an adhesive layer (not shown), but is not limited thereto.

Next, the scintillator layer 122 is disposed on the second flexible layer 124. For example, the scintillator layer 122 may be formed on the second flexible layer 124 via a deposition process (such as an evaporation deposition process), but is not limited thereto.

Figure 4:
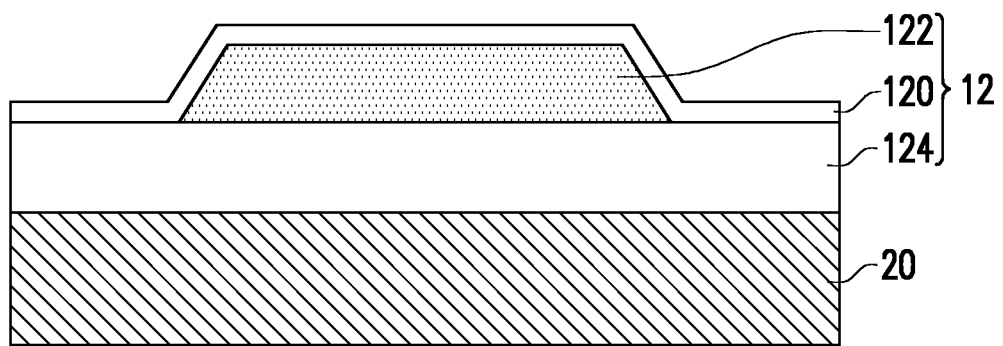

With reference to FIG. 4, the first flexible layer 120 is disposed on the scintillator layer 122. In some embodiments, the first flexible layer 120 may be further disposed on the second flexible layer 124, but is not limited thereto. After the first flexible layer 120 is formed, the step of disposing the flexible scintillator structure 12 on the carrier board 20 is preliminarily completed.

Figure 5:
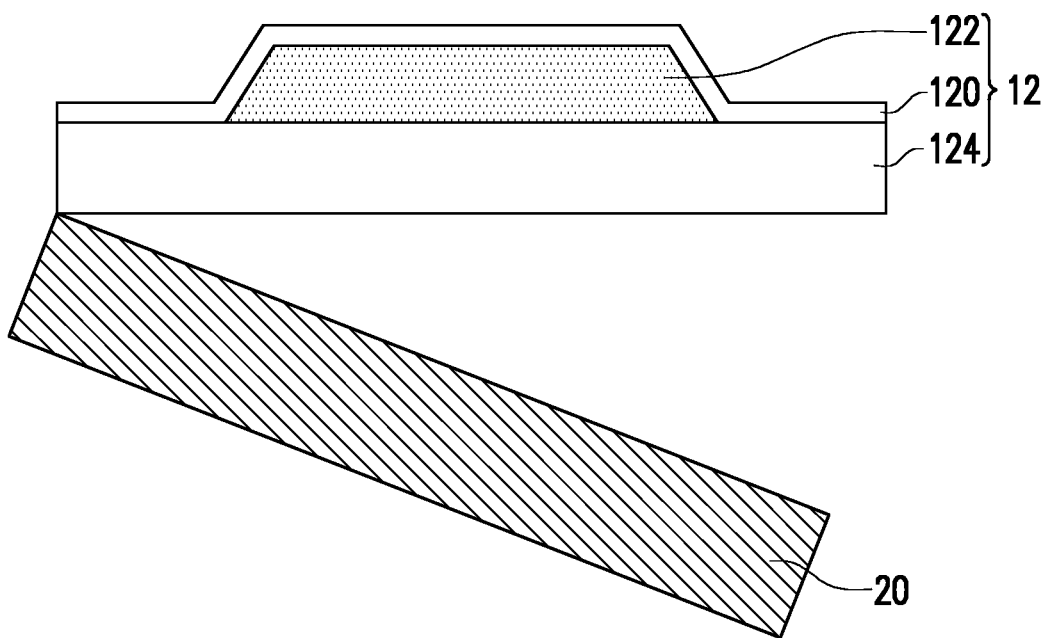

With reference to FIG. 5, the carrier board 20 is removed. For example, the carrier board 20 may be removed by adopting one of the following processes of a laser stripping process, a mechanical stripping process, a UV light irradiation step, a heating process, and a cooling process according to the manner of bonding between the carrier board 20 and the second flexible layer 124. Then, the flexible scintillator structure 12 is disposed on the sensor panel 10 (refer to FIG. 1). In some embodiments, as shown in FIG. 1, the flexible scintillator structure 12 and the sensor panel 10 may be bonded via the adhesive layer 14, but is not limited thereto.

Figure 6:
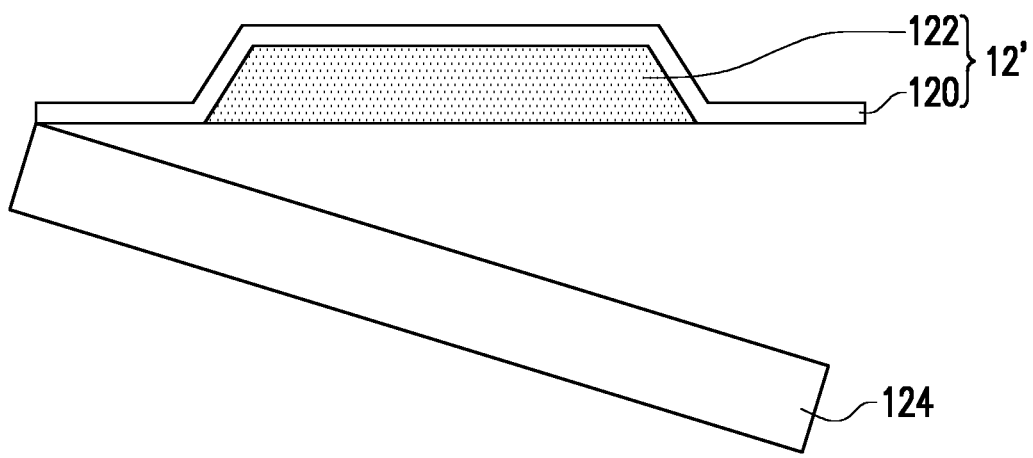

In some embodiments, as shown in FIG. 6, after the carrier board 20 is removed, the second flexible layer 124 may be further removed to form a flexible scintillator structure 12' that does not include the second flexible layer 124. Then, the flexible scintillator structure 12' is disposed on the sensor panel 10 (refer to FIG. 1). For example, the flexible scintillator structure 12' and the sensor panel 10 may be bonded via the adhesive layer 14 (refer to FIG. 1), but is not limited thereto.

With reference to FIGS. 1 and 6, after the flexible scintillator structure 12 or the flexible scintillator structure 12' is disposed on the sensor panel 10 (refer to FIG. 1), the circuit board 16 may be selectively connected to the sensor panel 10, and the sensor panel 10, the flexible scintillator structure 12 or the flexible scintillator structure 12', the adhesive layer 14, and the circuit board 16 are accommodated into the housing 18.

In the manufacturing method of the X-ray device, since the scintillator structure is flexible, when disposing the flexible scintillator structure 12 or the flexible scintillator structure 12' on the sensor panel 10, a vacuum bonding machine for hard-to-hard bonding may not be used. For example, a general roller bonding machine may be used in place of the vacuum bonding machine to simplify the bonding process, and overcome issues of difficulty in large-area bonding and easy generation of air bubbles on the bonding surface. In addition, compared to forming all the elements (such as the flexible scintillator structure 12, the sensor panel 10, and the circuit board 16) on the carrier board before removing the carrier board, the yield is improved or the cost is reduced under the same output by respectively manufacturing the multiple elements in the X-ray device before assembling the elements together.

In summary, in the embodiments of the disclosure, since the scintillator structure is flexible, when disposing the flexible scintillator structure on the sensor panel, a general roller bonding machine is used in place of a vacuum bonding machine to simplify the bonding process, and overcome issues of difficulty in bonding or easy generation of air bubbles on the bonding surface. Therefore, the X-ray device and the manufacturing method thereof according to the embodiments of the disclosure help to improve the yield or reduce the cost. In some embodiments, the sensor panel may also be a flexible sensor panel or a curved sensor panel. Correspondingly, the X-ray device may be a flexible X-ray device or a curved X-ray device. In some embodiments, the flexible scintillator structure may include a reflective layer to improve the recovery rate of the visible light. In some embodiments, the flexible scintillator structure may include a water barrier layer to reduce the negative impact of moisture on the scintillator layer or to prolong the usage lifespan of the scintillator layer.

The foregoing embodiments are used to illustrate the technical solutions of the disclosure, and not intended to limit the disclosure. Although the disclosure has been described in detail with reference to the foregoing embodiments, persons skilled in the art should understand that modifications may be made to the technical solutions described in the foregoing embodiments or equivalent replacements may be made to some or all of the technical features. However, the modifications or replacements do not cause the essence of the corresponding technical solution to depart from the scope of the technical solutions according to the embodiments of the disclosure.

Although the embodiments and advantages of the disclosure have been disclosed as above, it should be understood that persons skilled in the art may make changes, replacements, and modifications without departing from the spirit and scope of the disclosure, and the features between the embodiments may be arbitrarily mixed and replaced to become other new embodiments. In addition, the protection scope of the disclosure is not limited to the process, machine, manufacturing, material composition, device, method, and step in specific embodiments described in the specification. Persons skilled in the art may understand the current or to-be-developed process, machine, manufacturing, material composition, device, method, and step from the content of the disclosure, which may be used according to the disclosure as long as the substantially same functions may be implemented or the substantially same results may be obtained in the embodiments described herein. Therefore, the protection scope of the disclosure includes the foregoing process, machine, manufacturing, material composition, device, method, and step. In addition, each claim constitutes a separate embodiment, and the protection scope of the disclosure also includes a combination of the claims and embodiments. The protection scope of the disclosure should be subjected to the scope defined in the appended claims.

What is claimed is:

1. A manufacturing method of an X-ray device, comprising:
   providing a sensor panel;
   disposing a scintillator layer on the sensor panel; and
   disposing a first flexible layer on the scintillator layer, and
   wherein the scintillator layer comprises a polycrystalline part and a single crystal part, the polycrystalline part is adjacent to the sensor panel, and the single crystal part is away from the sensor panel.

2. The manufacturing method of the X-ray device according to claim 1, wherein the polycrystalline part and the single crystal part are transitional structures.

3. The manufacturing method of the X-ray device according to claim 1, wherein a height of the polycrystalline part is greater than 0 μm and less than or equal to 40 μm.

4. The manufacturing method of the X-ray device according to claim 1, wherein the sensor panel comprises a substrate and a sensor array disposed on the substrate.

5. The manufacturing method of the X-ray device according to claim 4, wherein the X-ray device further comprises a circuit board electrically connected to the sensor array.

6. The manufacturing method of the X-ray device according to claim 1, wherein the first flexible layer comprises a metal foil.

7. The manufacturing method of the X-ray device according to claim 1, wherein the X-ray device further comprises a housing for accommodating the sensor panel, the scintillator layer, and the first flexible layer.

8. The manufacturing method of the X-ray device according to claim 7, wherein the housing comprises a light incident part disposed on a light incident side of the X-ray device.

9. The manufacturing method of the X-ray device according to claim 8, wherein a material of the light incident part comprises carbon fiber.

10. The manufacturing method of the X-ray device according to claim 8, wherein the housing further comprises a carrier part connected to the light incident part for carrying the sensor panel.

* * * * *